JOHN D. EASTIN,
INVENTOR.

United States Patent Office 3,513,526
Patented May 26, 1970

3,513,526
FINE POSITIONING CONTROL FOR LEAD SCREW OF X-Y TABLE
John D. Eastin, Guilford, N.C., assignor, by mesne assignments, to the United States of America as represented by the Secretary of the Army
Filed Mar. 18, 1968, Ser. No. 713,930
Int. Cl. B23p *19/04;* H01r *43/04*
U.S. Cl. 29—203                                         8 Claims

ABSTRACT OF THE DISCLOSURE

Apparatus for fine positioning control of an indexing table having a workhead or assembly tool mounted thereon. The apparatus includes means for accurately positioning the workhead or assembly tool with respect to a workpiece mounted on the stationary base of the device. The apparatus includes one lead screw, mounted to the stationary base of the device, and disposed for actuation of the index table, and thereby the workhead, in the Y indexing dimension. Another lead screw mounted to the Y dimension housing, above and normal to the Y dimension lead screw, is disposed to move the index table, and thereby the workhead, in the X indexing dimension. A cam is secured to one end of each lead screw and is rotated, for vernier adjustment of the lead screw, by a plunger actuatable by an air cylinder responsive to rough positioning of the indexing table by the lead screw.

BACKGROUND OF THE INVENTION

Many positioning systems are known in the prior art that are used in manufacturing machinery or products, which automatically positions the workpiece or workhead by means of carriages, templates and the like. Systems have been designed to control the positioning of the article or workpiece electrically by means of servomotor systems, and mechanically by means of power-driven shaft screws. Each type of system possesses limitations which have proven to be detrimental to efficient and accurate manufacturing and to assembly operations.

Devices controlled by servomotor, e.g., are effective and efficient in obtaining approximate locations of a workpiece with respect to a tool, however, for obtaining a definite location, the servomotor performs inherent hunting operations that are time consuming. Conventionally, the driven threaded shafts or screws are usually driven at high speeds for a rough positioning and at low speeds for a final or accurate positioning of workpiece, however, to arrive at the final exact position, the system often exhibits hunting characteristics caused by inadequate positioning means or components. In addition, power-driven shafts either under or overdrives the workpiece past the desired final reference position.

SUMMARY OF THE INVENTION

The present invention discloses apparatus for fine positioning control for an X-Y indexing table. My apparatus is disposed for accurately positioning an indexing table having a workhead or assembly tool mounted thereon with respect to a fixed workpiece. The apparatus is provided with drive means to first roughly position an X-Y table having a workhead or assembly tool thereon and with a plunger operated cam drive mechanism for accurately positioning the table (workhead) relative to a workpiece. Responsive to the fine positioning, an insertion function may be performed by the assembly tool, such as inserting preformed insulators between selected terminals on a logic chassis of a computer and the like.

It is, therefore, an object of this invention to provide a positioning mechanism to affect an accurate final positioning between a tool and workpiece.

Another object of this invention is to provide a simple, low costing, and highly proficient positioning mechanism.

Further objects and advantages of this invention will become apparent upon the consideration of the detailed description in conjunction with the accompanying drawings;

DESCRIPTION OF THE PREFERRED EMBODIMENT

The following discussion is concerned with a fine positioning control for accurately positioning an indexing table, having a workhead or assembly tool positioned thereon, whereas the workhead or assembly tool is accurately positioned relative to a workpiece and is provided with mechanism for performing a work function on the workpiece.

Figure 1:
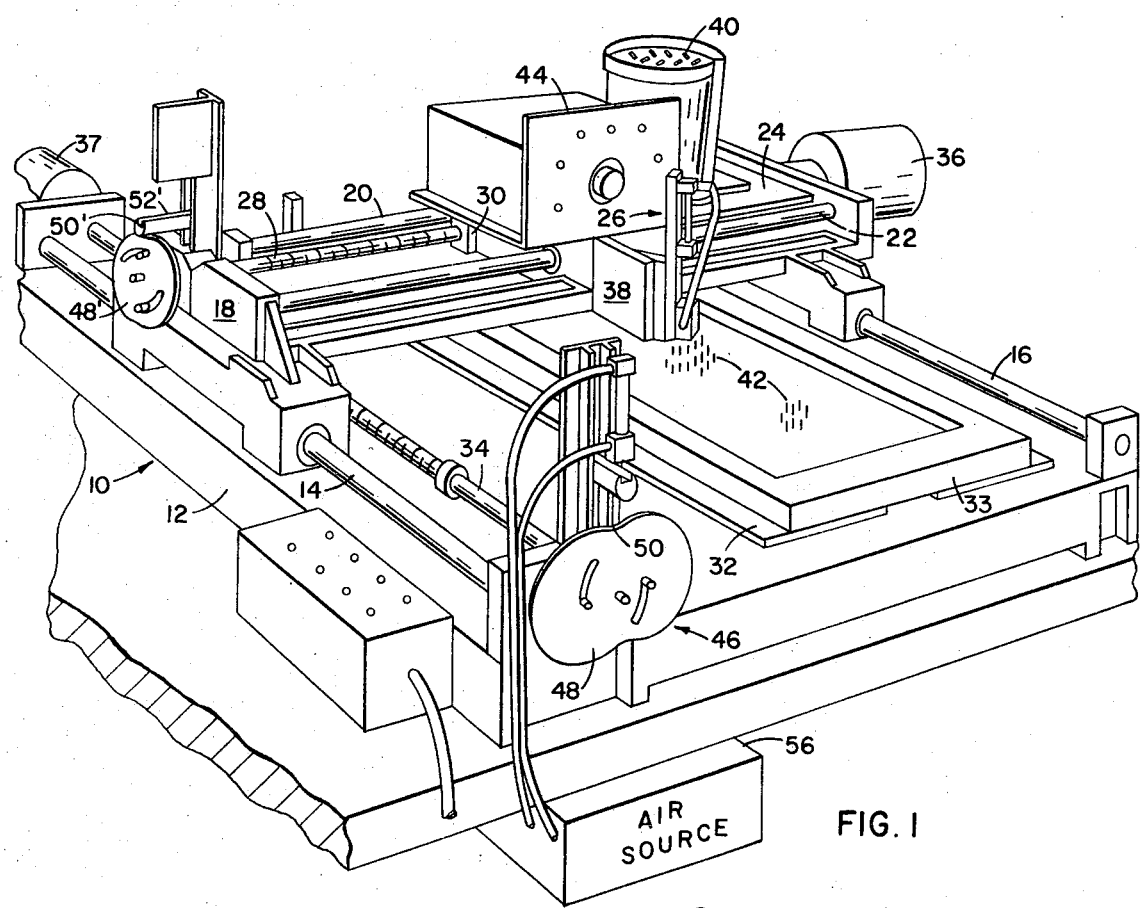
FIG. 1 is a pictorial view of the apparatus of my invention and illustrating the X-Y table and tool advanced to position above the workpiece whereby work may be performed on the workpiece.

As shown in FIG. 1, a device 10 is shown to include a base 12 having a pair of support members 14 and 16 mounted thereon for support of a movable carriage 18. Carriage 18 is provided with a pair of supports 20 and 22 disposed in normal relation to support members 14 and 16. Supports 20 and 22 are disposed for support thereon of a first platform 24 having a worktool 26 mounted thereon. A lead screw 28 is mounted on the carriage 18 in parallel relation with support members 20 and 22 and is disposed in threaded engagement with platform 24 through a threaded flange 30 carried thereon for movement of the platform along the lead screw responsive to rotation thereof.

A nonmovable platform 32 is supported beneath platform 24 on base 12 and is disposed to receive a workpiece 33 thereon. To move carriage 18 in a direction transverse to the direction of movement of platform 24 along lead screw 28, a second lead screw 34 is provided, in secured relation with carriage 18 for movement thereof along support members 14 and 16. Lead screw 34 and members 14 and 16 are mounted on the base 12 in substantially parallel relation. A source of power, such as AC motors 36 and 37, is secured to the end of lead screws 28 and 34, respectively, for independent rotation thereof to cause movement of platform 24 in either or both the transverse (Y) and the longitudinal (X) dimensions.

As shown in FIG. 1, workpiece 33 includes a logic chassis of a computer and the worktool 26 includes mechanism 38 for insertion of preformed insulators 40 onto terminals 42 of the logic chassis.

To assure that the tool is very accurately aligned with the workpiece to permit operation of the device, lead screws 28 and 34 are provided on the ends thereof with a fine positioning mechanism or vernier adjustment device 46 including a cam 48 having a V-shaped vertex 50 on both sides thereof and a plunger 52 actuatable by an air cylinder 54 connected to an air supply 56. A second fine positioning mechanism is provided for movement of a platform 24 and is similar in construction and operation to the device described. Like numbers have been used to identify like parts but the numbers have been primed for clarity.

Figure 2:
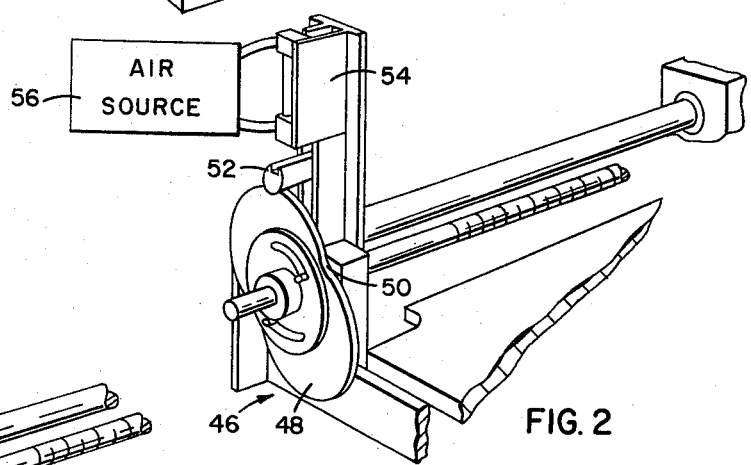
FIG. 2 is a pictorial view illustrating the position of the fine positioning mechanism when the table has been roughly positioned by the lead screws.
Figure 3:
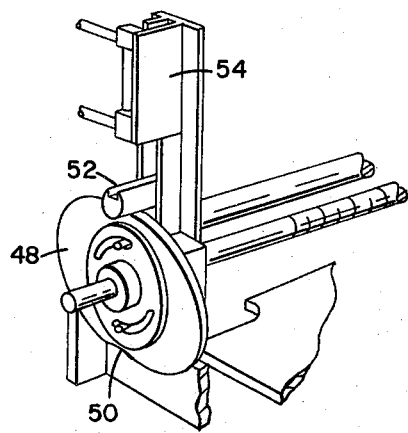
FIG. 3 is a view similar to FIG. 2, except the table has been accurately positioned by the fine positioning mechanism.

In operation, the workpiece is placed in predetermined position on platform 32 and the lead screw 34 is rotated by motor 37 to roughly position platform 24 in the Y dimension relative to the workpiece, whereupon the motor 37 is stopped, as by limit switches (not shown). Simultaneously, with the stopping of the motor, air source 56 is actuated for movement of plunger 52 downward against the peripheral surface of cam 48 for rotation thereof until the plunger rests in vertex 50 of the cam. (See FIG. 2.) This will cause rotation of the cam, and thus, the lead screw in a clockwise or counterclockwise direction, depending upon the position of the cam upon stopping of the motor, until the worktool and workpiece are in predetermined positions of alignment in the Y dimension. Similar operation of motor 36 moves platform 24 in the X dimension to a rough positioning relative to the worktool, whereupon plunger 52' is moved downward against the surface of cam 48' for rotation thereof until the plunger rests in vertex 50' of the cam. This will cause rotation of the cam, and thus, the lead screw in a clockwise or counterclockwise position until platform 24 is in position of accurate alignment with the workpiece. Mechanism 38 begins the insulator insertion function automatically when both X and Y conditions of alignment are met. Mechanism 38 rigidly attached to platform 24 and therefore responsive to alignment with respect to each of the terminals 42 of workpiece 33 during the travel of platform 24, is suitably geared to plunger 52 and cam vertex 50 for actuating the depositing of the insulators 40 onto the terminals 42.

I claim:
1. Apparatus for selectively positioning a tool relative to a workpiece so that said tool can perform a work function on said workpiece comprising:
  (a) a base having a cariage movably mounted thereon for displacement in a first direction, said base having said workpiece carried thereon, and a table movably mounted on said cariage for displacement in a second direction normal to said first direction, said table having said tool carried thereon;
  (b) lead screw means disposed for independent displacement of said carriage and said table in said normal directions for roughly positioning said tool relative to said workpiece;
  (c) actuating means including a cam drive device for rotation of said lead screw means for the fine positioning of said cariage and said table responsive to said rough positioning thereof.

2. Apparatus as in claim 1 wherein said actuating means includes
  (a) a cam mounted on one end of said lead crew means, and;
  (b) energizing means for rotation of said cam for imparting rotation of said lead screw for vernier positioning of said table and said carriage responsive to said rough positioning thereof.

3. Apparatus as in claim 2 wherein said cam is provided with indentations disposed on opposite sides of the periphery thereof; and, said energizing means includes a plunger disposed for engagement with the periphery of said cam to provide rotation thereto until said plunger rests in said indentations.

4. Apparatus as in claim 3 including pneumatic means for movement of said plunger responsive to rough positioning of said table and said carriage.

5. Apparatus as in claim 4 including:
  (a) a first pair of support members mounted on said base in parallel relation for supporting said carriage for linear motion in said first direction and;
  (b) a second pair of support members disposed on said carriage in parallel relation, normal to said first pair of support members, for supporting said table for linear motion normal to the first direction.

6. Apparatus as in claim 5 wherein said lead screw means includes a first lead screw carried by said base in parallel relation to said first pair of said support members; and a second lead screw carried by said carriage in parallel relation to said second pair of support members for movement of said table.

7. Apparatus as in claim 6 wherein said workpiece is a logic chassis of a computer.

8. Apparatus as in claim 7 wherein said tool includes mechanism for insertion of insulators about selected terminals of said chassis.

References Cited

UNITED STATES PATENTS 3,231,672   2/1966   Kreinberg et al.

THOMAS H. EAGER, Primary Examiner

U.S. Cl. X.R.

29—208